United States Patent [19]

Garitty et al.

[11] Patent Number: 5,027,297

[45] Date of Patent: Jun. 25, 1991

[54] SYSTEM FOR TIME STAMPING EVENTS USING A REMOTE MASTER CLOCK

[75] Inventors: James P. Garitty, Coral Springs; Thomas M. Yocom, N. Lauderdale, both of Fla.

[73] Assignee: ABB Power T & D Company Inc., Blue Bell, Pa.

[21] Appl. No.: 414,999

[22] Filed: Sep. 29, 1989

[51] Int. Cl.$^5$ .............................................. G04F 10/00
[52] U.S. Cl. .............................. 364/569; 340/825.08; 364/550
[58] Field of Search .............. 340/825.08; 364/464.04, 364/483, 550, 569, 464.03

[56] References Cited

U.S. PATENT DOCUMENTS

| | | | |
|---|---|---|---|
| 4,156,280 | 5/1979 | Griess | 364/550 X |
| 4,216,527 | 8/1980 | Emerson et al. | 364/483 |
| 4,234,926 | 11/1980 | Wallace et al. | 364/900 X |
| 4,400,783 | 8/1983 | Locke, Jr. et al. | 364/483 |
| 4,466,074 | 8/1984 | Jindrick et al. | 364/569 |
| 4,783,748 | 11/1988 | Swarztrauber et al. | 340/825.08 X |
| 4,811,249 | 3/1989 | Marsh | 364/464.04 X |

Primary Examiner—Parshotam S. Lall
Assistant Examiner—Edward R. Cosimano
Attorney, Agent, or Firm—Richard V. Westerhoff

[57] ABSTRACT

Events at spaced locations, such as contact activity in the protective relays of an electric power distribution network, are time stamped using a single remote clock by a system which includes one or more slave stations monitoring the events. Each slave station initiates a count of locally generated clocking pulses of fixed duration upon detection of the first event monitored by it. Identification of the first event is stored in a first slot in memory. Additional memory slots each store the identification of a subsequent event and the count at the occurrence of that subsequent event. Upon command from a remote master station, the current count is stored in the first slot and the contents of the first slot and of the additional slots are transmitted over a communications network to the master station. The master station calculates the absolute time of each event using its master clock, the transmitted counts, the fixed duration of the clocking pulses, and the transmission time required to transmit the data from the particular slave station to the master station. The master station then sends a clear command to reset the count and clear the memory slots. If the number of events detected by a slave station before a clear command is received exceeds the number of memory slots available, the information on the first event stored in the first slot is retained, and the additional slots retain data on as many of the most recent events as there are additional slots.

16 Claims, 7 Drawing Sheets

SYSTEM FOR TIME STAMPING EVENTS USING A REMOTE MASTER CLOCK

BACKGROUND OF INVENTION

1. Field of Invention

This invention relates to a system for determining the absolute time of the occurrence of events at one or more spaced locations using a local counter at each location and a single, remote absolute clock, and has particular application to time stamping contact activity in a number of protective relays in an electric power distribution network.

2. Background Information

There are many applications where it is desirable to record the real time, known as time stamping, of certain events to provide a historic view of the activity of a particular device. Normally, a real-time clock is used to provide accurate time references for the stamps. Difficulties arise, however, when several devices are linked and yet do not share the same clock reference. Clocks will drift with respect to each other resulting in inaccurate time stamps.

This problem can occur in attempting to time stamp contact activity in protective relays which control circuit breakers in an electric power distribution system. It is desirable in such an application to determine the time of contact activity in the different relays with an accuracy of a few milliseconds for use in analyzing the sequence of events if there is a disturbance in the system.

It is an object of the invention, therefore, to provide a system which generates accurate time stamps of events in a number of devices such as contact activity in the protective relays in an electric power transmission system.

It is a more specific object of the invention to provide such a system which utilizes a single absolute clock to provide accurate time stamps for monitored events in each of the separate devices.

It is another object of the invention to provide such a system which provides accurate time stamps for at least a certain number of the most recent of the monitored events in each device.

It is still another object of the invention to provide such a system which stores information used to generate the time stamps in slave stations associated with each device and transmits this information to a master station which contains the single absolute clock.

SUMMARY OF THE INVENTION

These and other objects are realized by the invention which is directed to a system which includes in its broadest terms, a slave station which upon the occurrence of a predetermined event initiates a count of clocking pulses of fixed duration. This count represents the relative time since the occurrence of the event. In response to a send command, the current count is transmitted to a master station over a communications network. The master station includes a master clock which maintains the absolute time. It also contains a processing unit which calculates the absolute time of the event as a function of the transmitted count, the duration of the interval between clock pulses, the absolute time maintained by the absolute clock in the master station, and the transmission time required to transmit the count from the slave station to the master station.

In preferred form of the invention, a slave station monitors a plurality of events, and the detection means includes means for identifying the particular event. The slave station also includes a memory device having a first slot in which the identification of the first event which initiates the count is stored. The memory includes additional slots in which the identification of subsequent events and the count at the time of the occurrence of the subsequent events are stored. In this embodiment, when the send command is received, the identification of the first event and the current count in the counter are transmitted to the master station along with the identification and counts associated with each of the subsequent events stored in the additional memory slots.

The master station calculates the absolute time of the first event by subtracting from the current absolute time maintained by the master station the transmission time from the respective slave stations and the product of the count at the time of transmission multiplied by the fixed duration of the clocking pulses. The absolute times of the subsequent events are then calculated by adding to the absolute time of the first event, the count stored at the occurrence of the subsequent event multiplied by the fixed time duration of the clocking pulses.

A clear command, preferably generated by the master station, is sent to the slave stations over the communications network after receipt of the data from the slave station. The clear command clears the memory and stops and resets the count.

Each slave station has only a predetermined number of additional memory slots. If more events are detected, the data for the predetermined number of most recent events are retained in the predetermined number of additional memory slots. However, the data for the first event is retained, since this is the event from which the absolute times for all of the subsequent events are calculated.

As long as data is collected by the master station on a regular basis, errors due to variations in clocking pulses in the various slave stations is insignificant.

The invention has particular application to providing absolute time stamps for contact activity in the protective relays of an electric power distribution network.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention has particular application to time stamping contact activity in protective relays in an electric power distribution network and will be described in that environment, however, it will be clear to those skilled in the art that the invention has application to the time stamping of other events in other devices and in other systems.

Figure 1:
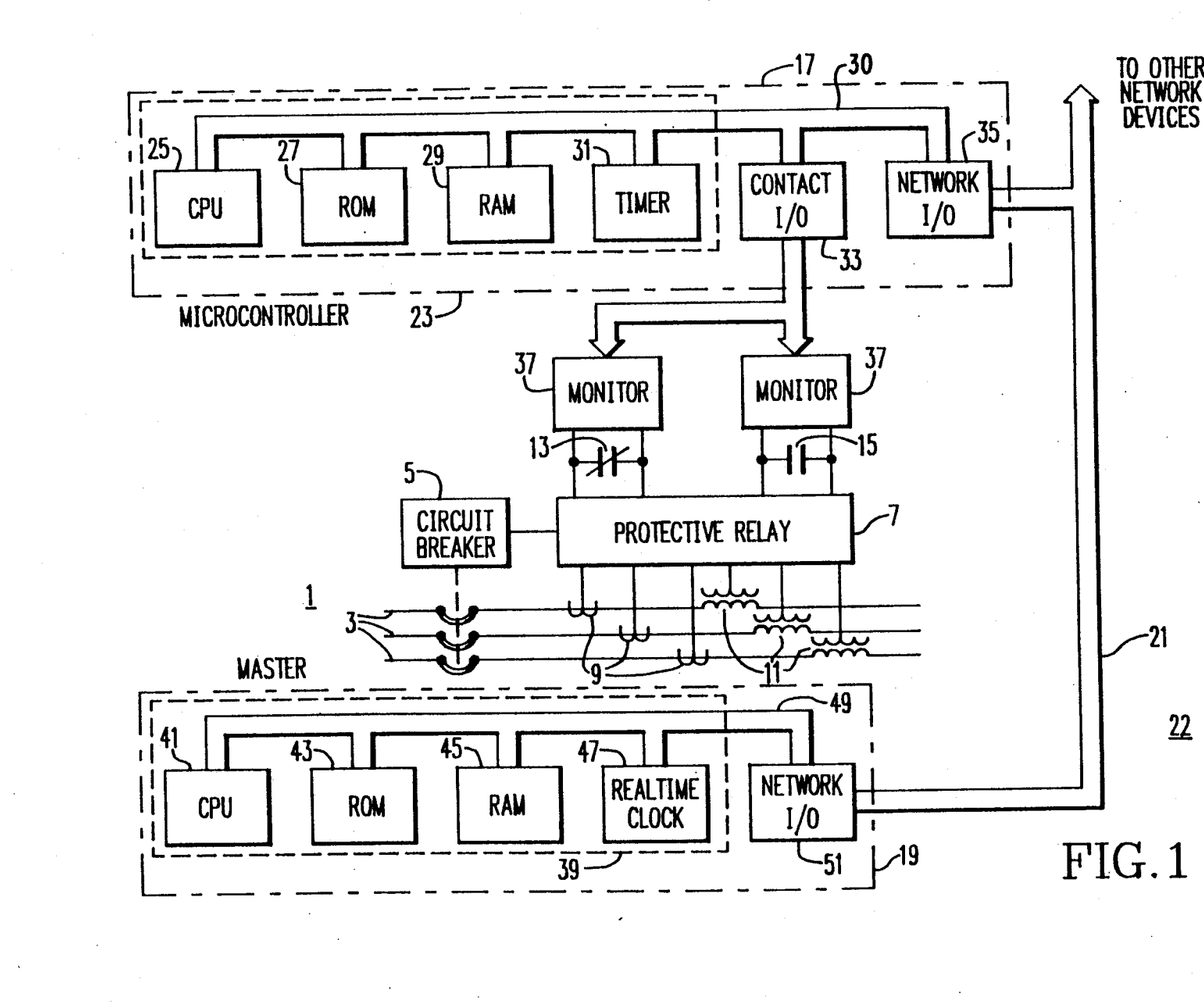
FIG. 1 is a schematic diagram of a portion of an electric power distribution network incorporating the invention.

As shown in FIG. 1, the electric power distribution network 1 includes a three-phase segment comprising the conductors 3 which is protected by a circuit breaker 5. The circuit breaker 5 is controlled by a protective relay 7 which may be one of several known types. Such a protective relay 7 monitors the current in the conductors 3 through current monitors 9 and, the voltage through potential transformers 11. As is well known in the field, the protective relay 7 trips the circuit breaker 5 to open circuit the conductors 3 upon the detection of specified abnormal conditions.

The protective relay 7 typically includes several electrical contacts which may for instance be normally closed type contacts 13 or normally open type contacts 15. In some protective relays, solid state switches are used rather than electromechanical relays. However, even these devices typically use the more reliable contacts of electromechanical relays as outputs. In any event, it is to be understood that the invention is applicable to devices with outputs indicating the occurrence of selected events.

The contacts 13 and 15 perform various functions in the protective relay 7. For instance, one contact controls tripping of the circuit breaker 5, and another may activate an alarm upon the detection of certain conditions. Different types of protective relays in the distribution network can have contacts performing different functions or indicating different conditions. The purpose of the invention is to provide accurate absolute time stamps of contact activity in all of the protective relays without the need to have an absolute clock associated with each relay, and all the problems attendant thereto.

In accordance with the invention, microcomputer based slave stations such as 17 are associated with the protective relays 7. The slave stations 17 are linked with a master station 19 over a network bus 21 to form a network 22. Each slave station 17 includes a microcontroller 23 comprising a central processing unit (CPU) 25, a read only memory (ROM) 27 in which the microcontroller program is stored, a random access memory (RAM) 29 in which the time stamping data and other parameters are stored, a timer 31 which provides the clock pulses for the microcontroller, and a bus 30 interconnecting all of these components. Also connected to the bus 30 are a contact input/output device 33 through which the status of the protective relay contacts is monitored, and a network input/output device 35 connecting the slave station 17 to the network bus 21.

The contacts 13, 15 are "wet", that is a voltage is applied across them continuously. Thus, a monitoring circuit 37 connected across each contact 13, 15 will detect the applied voltage when the contact is open, and zero voltage when the contact is closed. This indication is used to generate a logic signal which is applied to the contact input/output device 33 for entry into the microcontroller 31. Each slave station 17 can monitor multiple contacts of a single protective relay or one or two contacts of two or more protective relays, depending upon the number of contacts of each protective relay to be monitored and the capacity of the slave station. Multiple slave stations 17 can be connected to the network 22.

Each of the slave stations respectively samples the status of each of the contacts 13, 15 that it is assigned to monitor. Such contacts have a tendency to bounce and may be subject to transient conditions or "glitches" as they are known. Various schemes can be used to increase the reliability of detecting valid changes in contact status. A simple method is to require that a change in contact status persist for a certain interval in order to be considered valid.

Upon the detection of a change in status of any of the monitored contacts of the associated protective relay(s), the microcontroller 25 initiates a count. The count is generated by clocking pulses derived from the microcontroller timer 31. Such pulses are generated at fixed intervals and thus the count is a measure of the relative time since the first change in contact status. Where there are several contacts assigned to a slave station 17, the identification of the first contact to operate is stored in a first memory slot in the RAM. Upon the occurrence of a change in status of a second contact, the identification of that contact and the count at the time of the change in status of the second contact are stored in an additional slot in the RAM 29. The RAM 29 has a predetermined number of additional slots in which the identification and count associated with the predetermined number of additional contact operations are stored. It should be understood that multiple operations of a particular contact may be stored, such as repetitive operations of the contacts of a trip relay where repeated attempts are made to reset a circuit breaker which responds to a fault which has not been cleared.

The identification of the first contact operation which is stored in the first slot in RAM 29, the current count and the identification of additional contacts and the counts at which they operated which are stored in the additional slots in RAM 29 are sent over the network bus 21 to the master station 19 upon command from the master station. Such a send command can be generated by the master station 19 periodically for all the slave stations for instance, or the master station can poll the slave stations to determine if they have stored information to transmit and then just send the transmit command to those stations, as another example.

The master station 19 comprises a microprocessor 39 which includes a CPU 41, a ROM 43 in which the master station's programs are stored, a RAM 45 in which the data collected from the slave stations, the results of the master station's calculations and other parameters are stored, and a real time clock 47. A bus 49 connects all these components with each other and with a network input/output device 51 which interconnects with the network bus 21.

The master station 19 uses the information received from the slave stations to generate real time time stamps for each of the contact operations. The total accumulated count at the time that transmission of the data is commanded by the master station is stored as the count for the first contact operation. This count is referred to as $t_0$, time stamp zero. The master station calculates the absolute time of the first event as follows:

$$t_{0abs} = t_{current} - (t_0 * k + t_{transmission}) \qquad \text{Eq. 1}$$

where:

$t_0$ abs = absolute time of the first contact operation $t_{current}$ = current absolute time determined from real time clock 47 k = interval between clock pulses generated by slave stations $t_{transmission}$ = is time required to transmit data from the slave station to the master station and depends upon the transmission medium and other transmission delays.

For all subsequent events, the absolute time for that contact operation is calculated from the stored count by adding the absolute time of the first event to the product of the stored count for the subsequent event and the interval between counts. Thus:

$$\begin{aligned} t_{1\,abs} &= t_{0\,abs} + t_1 * k \\ t_{2\,abs} &= t_{0\,abs} + t_2 * k \\ &\vdots \\ t_{n\,abs} &= t_{0\,abs} + t_n * k \end{aligned} \qquad \text{Eqs. 2}$$

Where $t_{1\,abs}$ to $t_{n\,abs}$ = the absolute times of the subsequent events $t_1$ to $t_n$ = the stored counts for each additional event The master station 19 stores the calculated absolute times together with the identifications of the contacts in the RAM 45. This data may be extracted by conventional output devices and/or transmitted over the network 22 to other locations.

Following receipt of data from a slave station, the master station sends a clear command which resets the slave station to standby for a new first event and zeros the count. By collecting the data and resetting the counters in the slave stations with reasonable frequency, accumulated errors, such as those resulting from variations in the timing interval in the individual slave stations, are insignificant.

If the predetermined number of additional slots in the RAM 29 in a slave station becomes filled, the identification of the first event in the first memory slot is retained along with the identification and count for the most recent predetermined number of additional contact operations, and the count continues. Retention of the data for the most recent contact operations in addition to the data for the first may be accomplished in different ways, such as by shifting the data between the additional slots, discarding the oldest data, and inserting the new data in the empty slot, or by using pointers to indicate the oldest data and writing over the oldest data with the data for the newest contact operation. The data for the first event is retained since this is the event from which the relative timing of the subsequent events is calculated.

Figure 2:
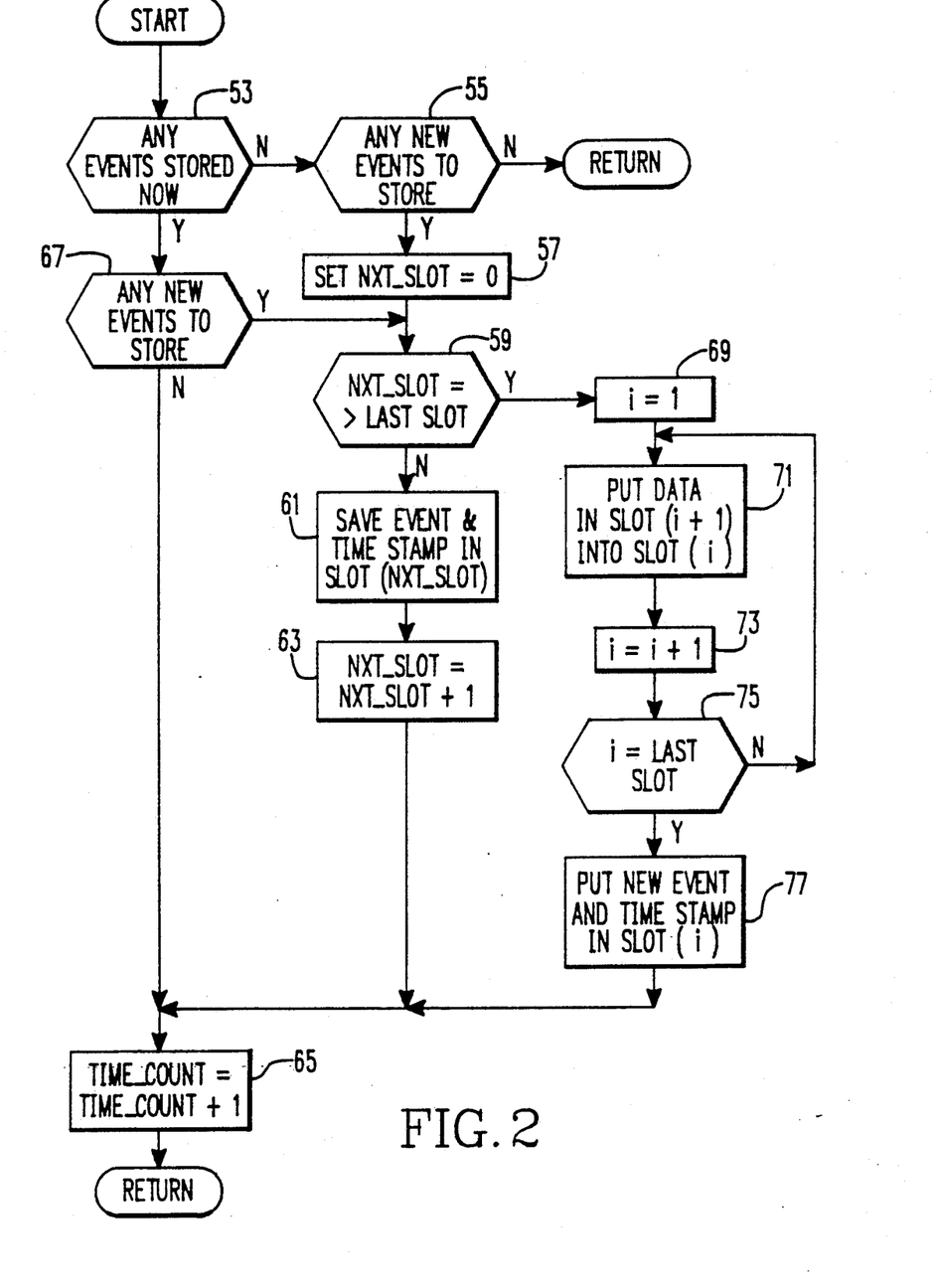
FIG. 2 is a flow chart of a suitable timer interrupt computer program used by the slave stations which form part of the system disclosed in FIG. 1.
Figure 4:
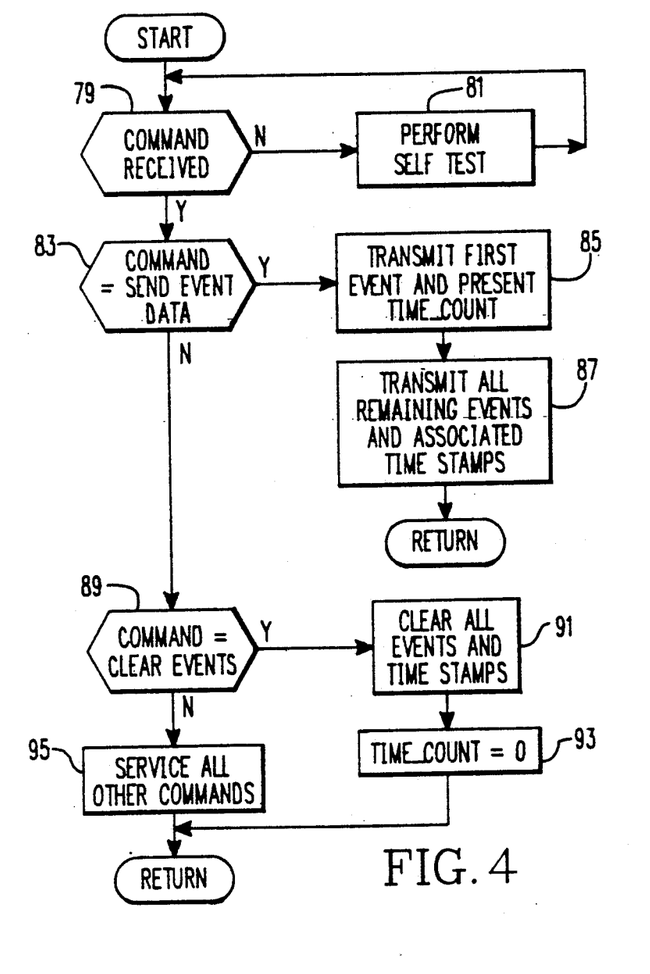
FIG. 4 is a flow chart of a suitable main computer program for such slave devices.

FIGS. 2 and 4 illustrate flow charts for suitable computer programs for the microcontrollers 23 of the slave stations 17. FIG. 2 shows a suitable timer-interrupt routine for the slave station. This routine is called at the predetermined interval determined by the timer 31. In an exemplary system this interval is 1.14428 msec. The routine of FIG. 2 is used in the embodiment in which data is shifted in memory if there is an overflow in order to maintain data for the most recent contact operations. Each time this routine is called, a check is made at 53 to determine if any events are already stored. If not, a check is made at 55 to determine whether any new event has occurred. If not, the program continues to cycle through these steps each time the routine is called until the first event is detected at 55. When this occurs, a pointer, "nxt_slot", is set equal to 0 at 57. If all the slots are not filled as determined at 59, and of course that would be the case in the instance of the first event, the identification of the event and the time stamp, are stored in the slot identified as "nxt_slot" as indicated at 61 and "nxt_slot" is incremented at 63. In this instance of the first event detected, the data is stored in slot 0. The count will be zero at this point, but it is the final count which is transmitted to the master station for calculating the absolute time of the first event. The count is then incremented at 65 before the routine is exited. The next time the routine is called, an event will be stored when the program is entered at 53, and if any new event has been detected at 67 since the last time the routine was run the identification of that event and the time will be stored, and "nxt_slot" will be incremented as previously described. Whether or not there are any new events detected at 67 on this run of the routine, the count is incremented at 65.

If on any run of the routine of FIG. 2 there is a new event to store and "nxt_slot" is equal to more than the last slot as determined in 59, meaning that the memory slots are all filled, an index, i, is set equal to 1 in box 69. The data in slot i+1 is then inserted into slot i as indicated at 71 and i is incremented at 73. The data is shifted successively in this manner for each slot until i equals the "last slot" as determined at 75. The identification of the new event and the count or time stamp for that new event is then stored in slot i as indicated at 77, and the count is again incremented at 65. For each subsequent run of the program, if the data is not collected by the master station, the data for the oldest contact event will be discarded in a similar manner and the data for the latest contact operation will be stored as just described.

Figure 3A:
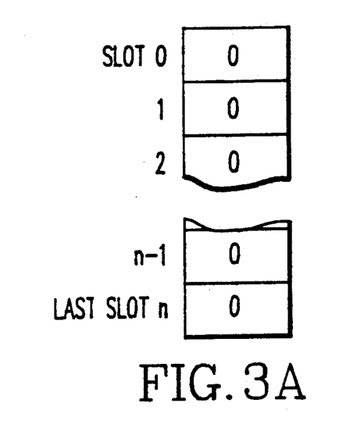
FIGS. 3A, 3B and 3C are maps of a portion of the random assess memory in the slave stations generated by the program shown in FIG. 2.
Figure 3B:
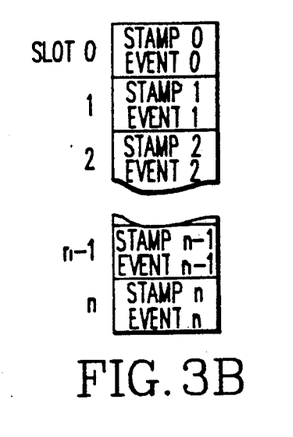
Figure 3C:
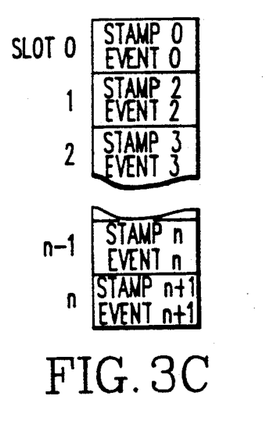

FIGS. 3A, 3B and 3C illustrate states of a memory map for a portion of the RAM 29 of the microcontroller in the slave station during use of the routine of FIG. 2. Slot 0 is used for storing the data for the first event and slots 1 to n are used for storing data associated with the additional events. The identification of the event represented by "event_" and the count at the time of the event represented by "stamp_" are stored in each slot for each event. Thus, as shown in FIG. 3A "event 0" and "stamp 0" are stored in slot 0 for the first event. The "stamp 0" for the first event is the count at the time that the command is received from the master station to transmit the data. The "stamp" for the other events is the count at which the event occurred. FIG. 3A illustrates the situation where no events have yet been detected. In FIG. 3B the buffer is filled and data for the n events has been stored. FIG. 3C illustrates the situation where one more event than there is storage space for has been detected. In this instance the data for the third event which is identified as "event 2" and "stamp 2" is moved from slot 2 to slot 1 and thus the information for the second event which was stored in slot 1 is discarded by being written over. The data from the nth event is moved into slot n−1 and the data for the new event n+1 is inserted in slot n. This process is repeated for each additional event with the data stored in slot 0 maintained throughout, the data in slot 1 is discarded and the data from the additional slots are moved up one with the data for the newest event being stored in slot n.

FIG. 4 illustrates the flow chart for a suitable main program for the microcontroller 23 of a slave station 17. If no command is received from the master station as determined at 79, the slave device performs a self test function such as indicated at 81. However, if the slave station receives a command at 83 to send the data to the master station, the identification of the first event stored in the first slot and the present count are transmitted as indicated at 85. The present count can be inserted into slot 0 for this purpose. Then the identification and time stamps for all the additional events are transmitted at 87. If the slave station receives a command to clear events as determined at 89, all events and time stamps are cleared at 91 and the count is reset to 0 at 93. If there is no clear command, other commands are serviced at 95. As is typical, clearing of the event and time stamp data does not require zeroing the memory, but is accomplished by a flag indicating there is no data to be transmitted and then writing over the old data.

Figure 5:
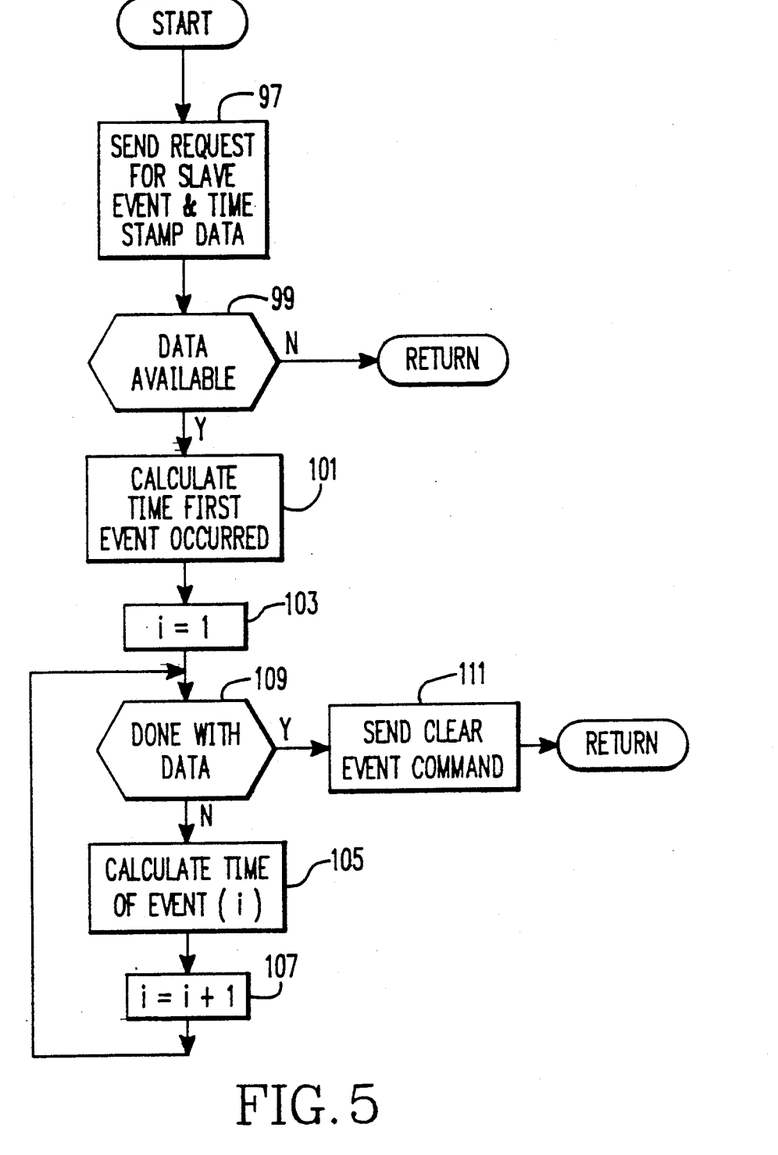
FIG. 5 is a flow chart of a suitable computer program for the master station which forms a part of the system shown in FIG. 1.

FIG. 5 illustrates the flow chart for a suitable computer program for the microcontroller 39 of the master station 19. The master station first sends a request successively to each slave station commanding that the stored events and time stamps be transmitted to the master station as indicated at 97. If data is available as indicated at 99, the time of the first event is calculated at 101 using equation 1 above. The index i is then set equal to 1 at 103 and a loop is entered in which the time for each of the additional events is calculated at 105 with i being successively incremented at 107 until data for each of the events transmitted has been processed as determined at 109. The master station then sends a "clear event" command to the slave station at 111.

Figure 6:
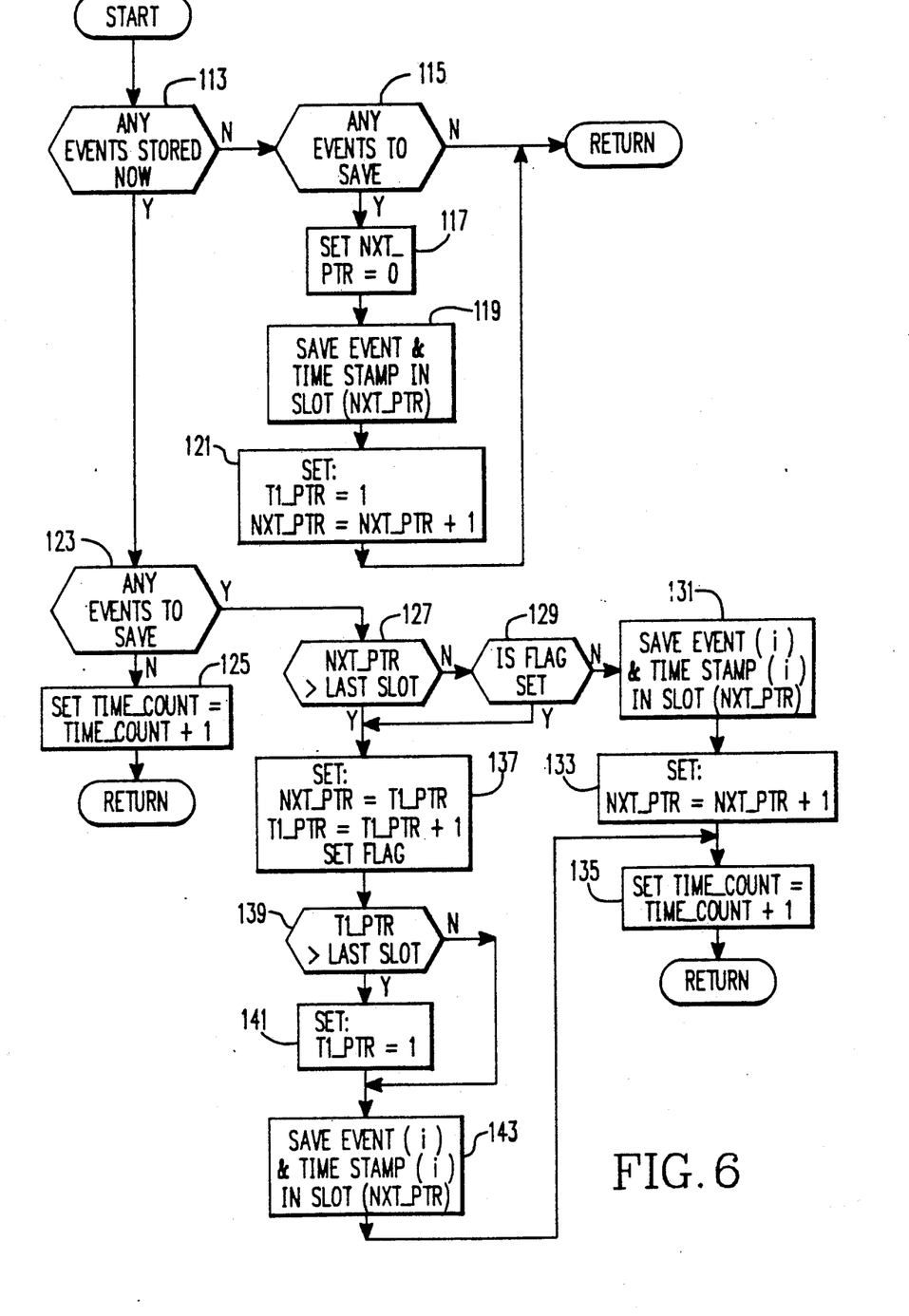
FIG. 6 is a flow chart of a suitable computer program for operating the slave stations in accordance with a second embodiment of the invention.

FIG. 6 illustrates a flow chart for a computer program for the microcontroller 23 of the slave station 17 in accordance with an alternate embodiment of the invention. Under this scheme, pointers are used to indicate the memory slot in which new data is to be written over the data for the oldest event when there is an overflow. Thus, data need not be shifted between slots as in the first embodiment of the invention discussed above. This routine uses two pointers, "nxt_ptr" which identifies the slot in which data for the next event is to be stored, and a "tl_ptr" which indicates the slot in which data is to be written over if there is an overflow. Referring to FIG. 6, if no events have been stored as determined at 113 when the first event is detected at 115, the "nxt_ptr" is set to 0 at 117 and the identification of the event and the time stamp, which will of course be 0 for the first event, as are stored in the slot 0 identified by the "nxt_ptr" as indicated at 119. The "tl_ptr" is then set equal to 1 and the "nxt_ptr" is made equal to "nxt_ptr+1" as shown at 121 and the program is exited. The program is also exited at 115 if no event is detected. On subsequent runs of the interrupt routine, there will, of course, now be events stored when checked at 113, and if there are no new events as determined at 123, the count will be incremented at 125 before the program is exited. When a new event is detected at 123 on any subsequent run of the interrupt routine, a determination is made whether the slots are all filled at 127. If not, and a flag is not set indicating that the slots have all been filled as determined at 129, then the identification of the event and the count is stored in the slot identified by the "nxt_ptr" as indicated at 131. The next pointer is then incremented at 133 and the count is incremented at 135 before the routine is exited. When during a subsequent execution of the interrupt routine it is determined that the slots are all filled as determined at 127 or there is an overflow as indicated by the flag being set as determined at 129, the "nxt_ptr" is set equal to the "tl_ptr," the "tl_ptr" is indexed, and the flag is set indicating that if an overflow has been detected, all as indicated at 137. If the "tl_ptr" has reached the last slot as determined at 139, then the "tl_ptr" is reset equal to 1 at 141. In either event, the identification of the event and the count are stored in the slot indicated by the "nxt_ptr" as shown at 143, and again, the count is incremented at 135 before the program is exited.

Figure 7A:
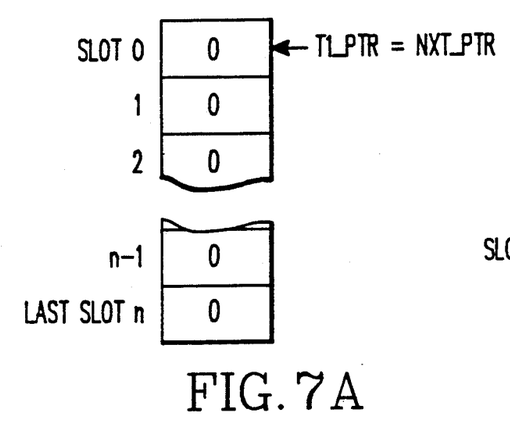
FIGS. 7A, 7B, 7C and 7D are maps of the random access memory of the slave device when operated in accordance with the program of FIG. 6.
Figure 7B:
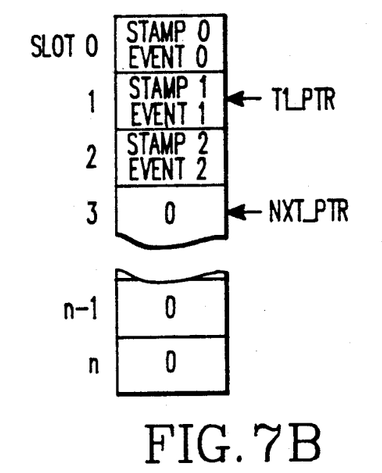
Figure 7C:
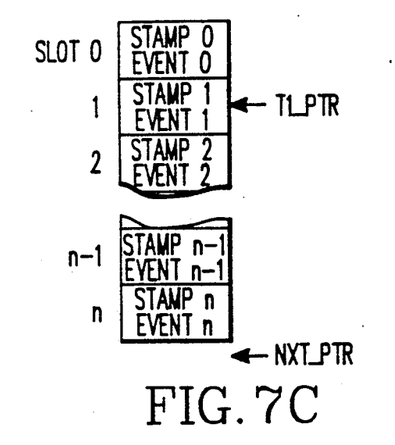
Figure 7D:
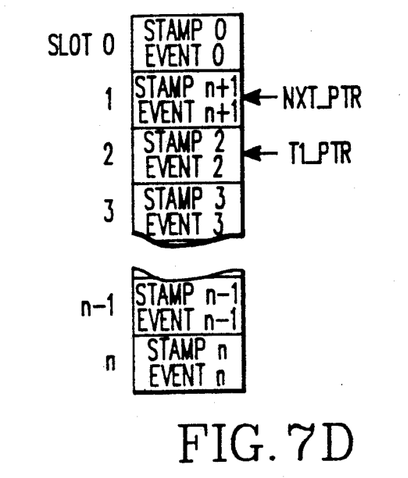

This procedure of using pointers to maintain the data for the most recent additional event and the first event is illustrated by FIGS. 7A through 7D. As seen from FIG. 7A, when no events are stored the "tl_ptr" and the "nxt_ptr" both point to slot 0. As data is entered, first in slot 0, the "tl_ptr" moves to slot 1 and remains there while the "nxt_ptr" indexes to the next slot to be filled as illustrated in FIG. 7B. When all of the slots have been filled as illustrated in FIG. 7C, the next pointer will be pointing to a nonexistent slot beyond the last slot, n. Upon detection of the next event, the "tl_ptr" advances to slot 2 and the "nxt_ptr" points to the first slot in which the data for the new event, n+1, is written over the data for the first additional event detected as shown in FIG. 7D. The "tl_ptr" and "nxt_ptr" then advance together through the slots and wrap around back to slot 1 when they reach n.

Figure 8:
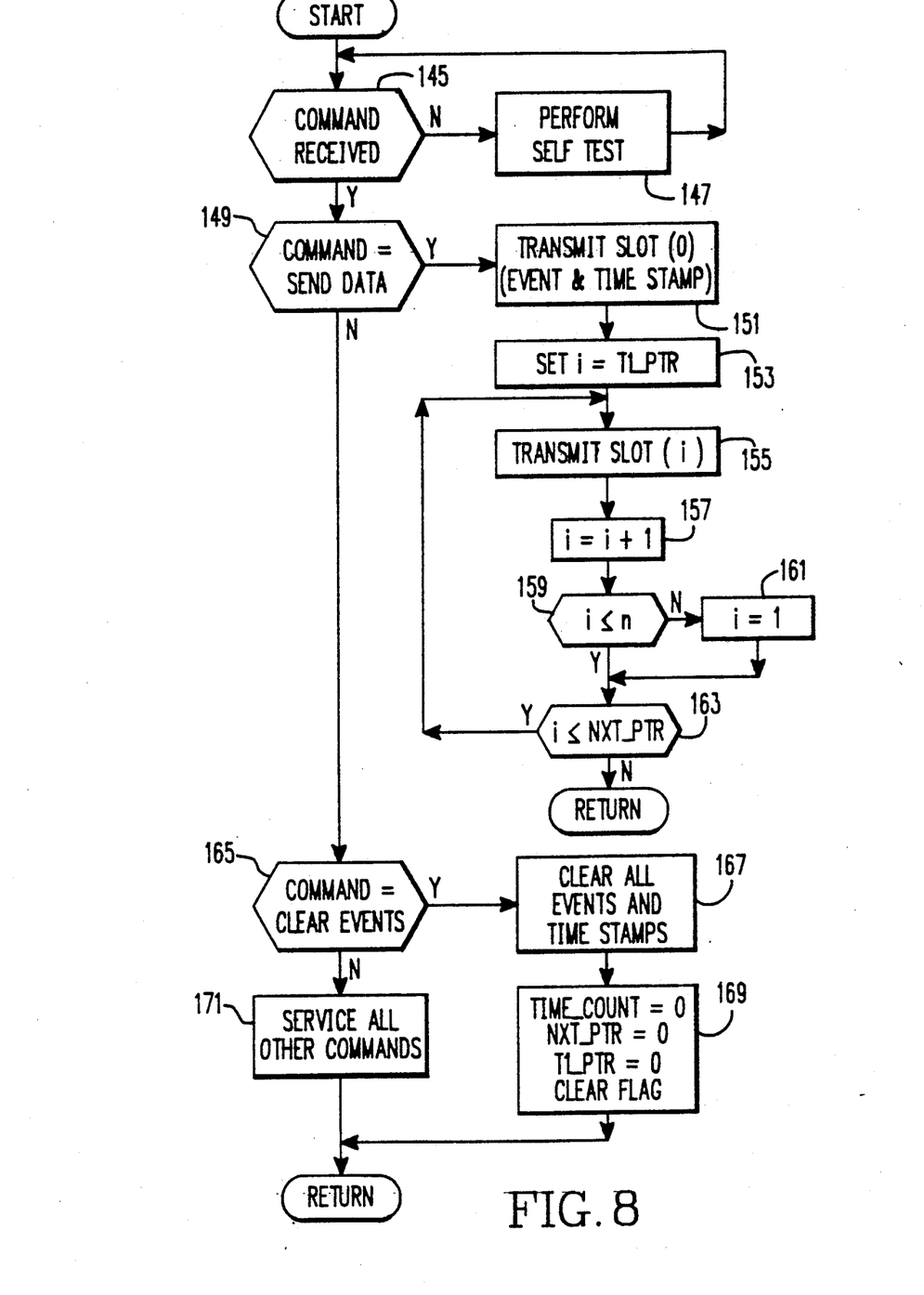
FIG. 8 is a flow chart of a suitable main program used by the slave devices when operated in accordance with the second embodiment of the invention.

FIG. 8 illustrates a flow chart for a suitable main program for the slave microcontroller 23 when the alternate interrupt routine of FIG. 6 is used. Again, as long as no commands are received at 145, the microcontroller performs a self test at 147. When a command to send data is received at 149, the data for the first event is transmitted at 151. An index, i, is then set equal to "tl_ptr" at 153 and the data for slit i is transmitted at 155. The index i is then incremented at 157. When the last slot is reached as determined at 159, i is reset to 1 at 161. The data from each subsequent slot is transmitted in the loop including blocks 155, 157, 159, 161, if necessary, and 163 until i becomes equal to "nxt_ptr" at 163 indicating that all of the data has been transmitted. With this sequence, the data for the first event is transmitted first followed in sequence by the data for the next oldest event up to the most recent event. If a "clear events" command is received from the master station at 165, all of the events and time stamps are cleared from the slots at 167 and then the count, the "nxt_ptr" and the "tl_ptr" are set equal to 0 and the flag is cleared at 169. All other commands are serviced at 171 if there is no send data at 149 or clear events command at 165.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A system for time-stamping events using a remote master clock, said system comprising:
   a slave station including:
     detection means detecting the occurrence of a predetermined event;
     pulse generating means generating clocking pulses at predetermined timed intervals; and
     counting means responsive to detection by said detection means of said predetermined event to initiate a count of said clocking pulses;
   communications means transmitting said count in response to a send command;
   means generating said send command; and
   a master station including:
     a master clock maintaining absolute time; and
     processing means responsive to said master clock and said count transmitted by said communications means for calculating an absolute time at which said predetermined event occurred from said count, the absolute time maintained by the master clock, the predetermined time interval between clocking pulses, and a transmission time representing the time required for transmission of said count from said slave station to said master station over said communication means.

2. The system of claim 1 including means terminating and resetting said count.

3. The system of claim 1 wherein said means generating said send command is in said master station, said send command being transmitted to the slave station by said communications means.

4. The system of claim 3 including plural slave stations each initiating a count of clocking pulses generated at said predetermined interval in response to an event detected by said slave station, each said slave station transmitting its count to said master station over said communications means in response to a send command, said means generating said send command generating a send command for each slave station, and said processing means calculating an absolute time at which said predetermined events at said plurality of said slave stations occurred from said counts transmitted by said slave stations, the absolute time maintained by said absolute clock in the master station, the predetermined time interval between clocking pulses, and transmission times for transmission of said counts from the slave stations to the master station.

5. The system of claim 1 wherein said detection means in said slave station detects and identifies a plurality of predetermined events including a first event and subsequent events, wherein said means initiating a count of said clocking pulses initiates said count of clocking pulses in response to the detection of said first event and continues said count through detection of said subsequent events, and wherein said slave station includes storage means storing identification of said first event, and the identification of subsequent events, and said count at the occurrence of those subsequent events, wherein said communication means transmits information comprising the stored identification of the first event, the count at the time of transmission, and the stored identification of said subsequent events and the counts at the occurrence thereof, to said master station in response to said send command, and wherein the processing means of the master station calculates from the information transmitted and said transmission time the absolute time of each of said identified events.

6. The system of claim 5 wherein said storage means has only a predetermined number of said additional slots and includes means when said additional slots all contain identification of an event and the count at the occurrence of said event, for retaining the identification of the first event in said first slot and for retaining in said additional slots the identification of, and the count at the occurrence of, the predetermined number of most recent events.

7. The system of claim 6 including means responsive to a clear command to clear information stored in said first slot and in each of said predetermined additional slots, and to terminate and clear said count.

8. The system of claim 5 wherein said storage means includes a first slot in which the identification of said first event and said count at the time of transmission are stored, and additional slots each of which stores the identification of one of said subsequent events and the count at the occurrence thereof.

9. The system of claim 8 wherein said slave station includes means responsive to a clear command, to clear information stored in said first slot and said additional slots and to terminate and clear said count.

10. The system of claim 9 wherein said master station includes means generating said clear command.

11. The system of claim 8 wherein said processing means in said master station calculates the absolute time of said first event by subtracting from the absolute time maintained by said master clock, said transmission time and the product of said count at the time of transmission multiplied by said predetermined time interval between clocking pulses.

12. The system of claim 11 wherein said processing means in said master station calculates the absolute time of each of said subsequent events by adding to the absolute time calculated for said first event the product of the count at the occurrence of that subsequent event multiplied by said predetermined time interval between clocking pulses.

13. In an electric power distribution network having a plurality of protective relays each with at least one electrical contact operated in response to conditions in said network detected by the relay, a system for remotely determining the absolute time of operation of said contacts comprising:
   a plurality of slave stations each including:
     means detecting the operation of and identification of at least one contact of at least one of said protective relays;
     means generating clocking pulses at a fixed time interval common to all slave stations;
     means responsive to said detection means for initiating a count of said clocking pulses in response to operation of a first of said contacts; and
     storage means for storing information in slots including a first slot for storing the identification of the first contact and in response to a send command the total count at the time of said send command, and additional slots each storing the identification of a contact subsequently operated and the count at the instant such contact is subsequently operated;
   a communications network over which each slave station sends in response to said send command the information stored in the first slot, and in said additional slots; and a master station connected to said communications network to receive said information sent from each slave station, and including:

a master clock maintaining a current absolute time;

means generating said send command; and processing means determining the absolute time of the operation of each contact from said total count, the counts stored in said additional slots, said fixed time interval, said current absolute time, and a transmission time for transmitting the information from the slave station in which it is stored to the master station.

14. The system of claim 13 wherein said slave stations include means clearing said slots and for resetting said count.

15. The system of claim 14 wherein said master station includes means generating a clear command and said means in said slave stations clearing said slots and resetting said count is responsive to said clear command.

16. The system of claim 15 wherein said slave stations have only a predetermined number of additional slots and include means retaining in said additional slots the identification and count for said predetermined number of most recently operated contacts while maintaining said identification of said first event in the first slot and continuing said count.

* * * * *